May 19, 1970     J. W. GIBBS ET AL     3,512,547
SINGLE CONTROL FAUCET FOR SELECTIVELY MIXING HOT AND COLD WATER
Filed Sept. 4, 1968     3 Sheets-Sheet 1
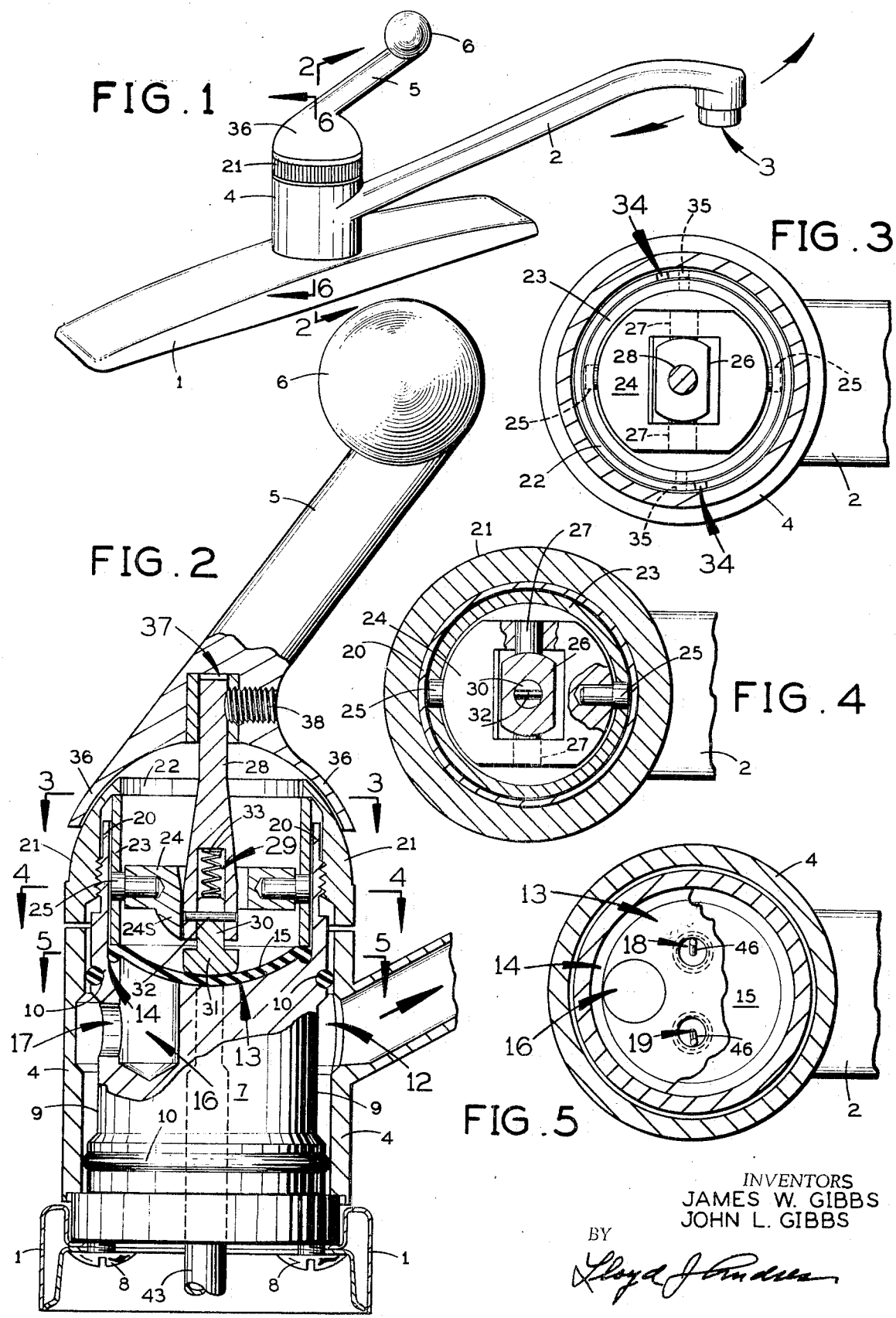
INVENTORS
JAMES W. GIBBS
JOHN L. GIBBS
BY
Lloyd J Andrus May 19, 1970     J. W. GIBBS ET AL     3,512,547
SINGLE CONTROL FAUCET FOR SELECTIVELY MIXING HOT AND COLD WATER
Filed Sept. 4, 1968     3 Sheets-Sheet 2

INVENTORS
JAMES W. GIBBS
JOHN L. GIBBS
BY
Lloyd J Andres

May 19, 1970  J. W. GIBBS ET AL  3,512,547
SINGLE CONTROL FAUCET FOR SELECTIVELY MIXING HOT AND COLD WATER
Filed Sept. 4, 1968  3 Sheets-Sheet 3
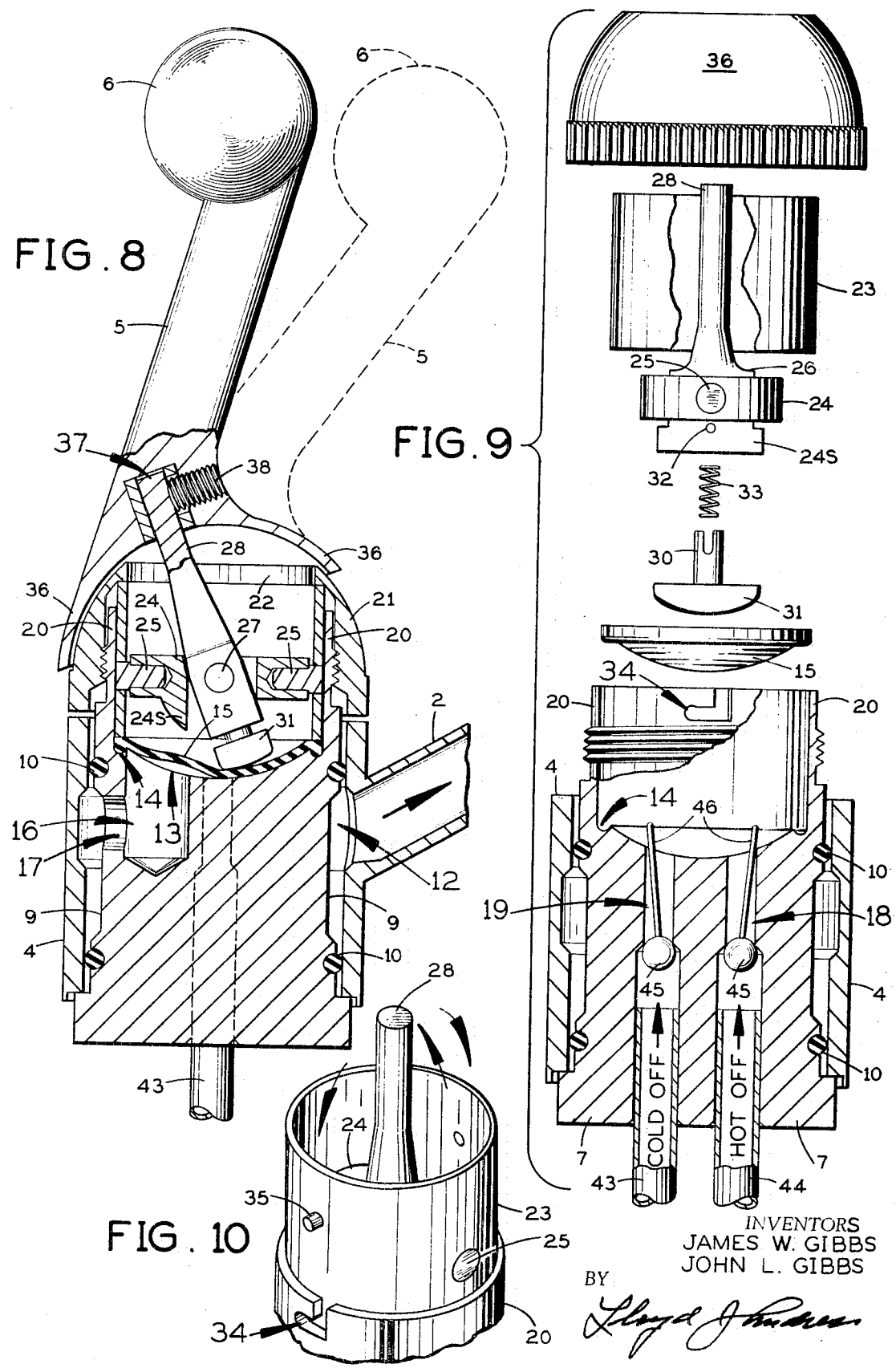
INVENTORS
JAMES W. GIBBS
JOHN L. GIBBS
BY
Lloyd J. Andres United States Patent Office 3,512,547
Patented May 19, 1970

3,512,547
SINGLE CONTROL FAUCET FOR SELECTIVELY MIXING HOT AND COLD WATER
James W. Gibbs, 8027 W. 14 Ave., Hialeah, Fla. 33012, and John L. Gibbs, 14820 Miami Lake Way E., Miami, Fla. 33522
Filed Sept. 4, 1968, Ser. No. 757,304
Int. Cl. F16k 11/02
U.S. Cl. 137—329.3                                 6 Claims

ABSTRACT OF THE DISCLOSURE

A single control faucet for connection to pressurized sources of hot and cold water including a lever operated diaphragm for starting and stopping the flow of water through a movable spout for selectively mixing the hot and cold water or selecting the degree of flow of hot or cold water by corresponding predetermined positions of the lever.

---

This invention relates in general to faucets and more particularly to a single lever faucet for connection to independent sources of hot and cold water and permitting the selective operation of the lever to provide a selective predetermined mixing of the hot and cold water from the spout of the faucet.

Prior single lever hot and cold faucets require a ball-type valve which is expensive to manufacture, subject to leakage and difficult to service and repair.

A further object of the invention is the provision of a single lever faucet for selectively mixing hot and cold water including a hermetically sealed swingable spout adjustable to selected positions for delivering the flow of water to the corresponding selected positions.

Another object of the invention is the provision of a single lever faucet for mixing and stopping and starting the flow of hot and/or cold water including a diaphragm selectively responsive to the position of the lever for opening and closing hot and cold inlet passages and opening and closing the outlet passage to the spout.

A further object of the invention is the provision of a single lever faucet in which a pressure operated valve is positioned in the hot and the cold inlet passages, which will automatically close and prevent the flow of water when the working parts of the valve are inspected or disassembled.

These and other objects and advantages in one embodiment of the invention are described and shown in the following specification and drawings, in which:

FIG. 1 is a perspective view of the faucet assembly in reduced scale.

FIG. 2 is an enlarged fragmentary cross sectional view taken through section line 2—2, FIG. 1.

FIG. 3 is a fragmentary cross sectional plan view taken through section line 3—3, FIG. 2.

FIG. 4 is a fragmentary cross sectional plan view taken through section line 4—4, FIG. 2.

FIG. 5 is a fragmentary cross sectional view taken through section line 5—5, FIG. 2.

FIG. 8 is the same as FIG. 2 in changed position.

FIG. 9 is an exploded view of elements shown in FIG. 6.

FIG. 10 is a perspective view of a partial assembly of elements shown in FIGS. 2 and 6.

Figure 6:
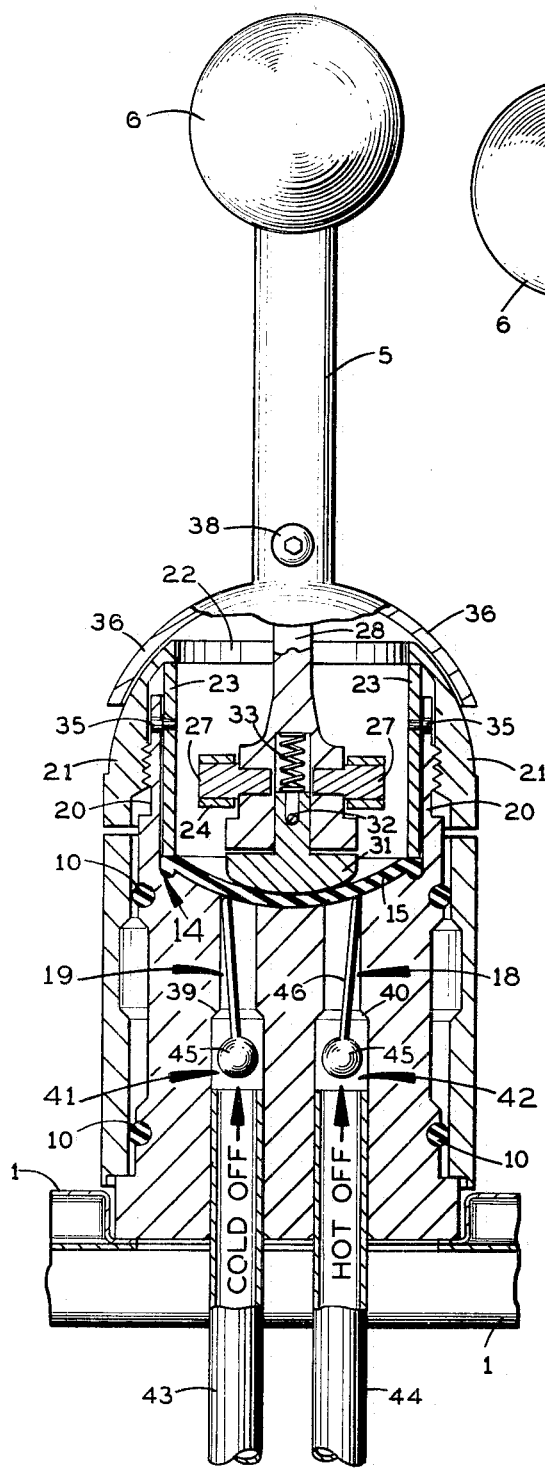
FIG. 6 is an enlarged fragmentary cross sectional front elevation taken through section line 6—6, FIG. 1.

Referring to FIG. 1, an ornamental base member 1 is provided to retain the faucet mechanism to a basin or sink. A spout 2, having an outlet orifice 3, has an integral collar 4 rotatable about a vertical axis. A handle 5, movable in all lateral directions, terminates in an integral ball shaped knob 6.

Referring to FIG. 2, a cylindrical body 7 is secured to base member 1 by screws 8—8 and a coaxial cylindrical undercut 9 about the waist thereof forming a water passage. A resilient O ring 10 is retained in grooves in the body above and below the undercut 9 positioned between the body and the inner periphery of the collar 4. The O rings 10 seal the chamber formed between undercut 9 and collar 4 and provide a pathway for water to flow from the spout 2. The upper end of the body 7 terminates in a coaxial concave spherical cavity 13 surrounded by a groove 14.

A flexible diaphragm 15, preferably made from a fabric reinforced elastomer material such as neoprene, is shaped with a rim of semi-circular cross section in engagement with the groove 14 and the under portion thereof normally in contact with the spherical cavity 13.

Referring to FIGS. 2 and 3, a vertical outlet bore or port 16 in body 7 extends through the surface of the spherical cavity 13 and joins with orifice 17, which is open to the passage formed by undercut 9 for entrance to a passage 12 entering the spout.

Referring to FIG. 5, a vertical cold water inlet bore or port 18 and a vertical hot water inlet bore or port 19 in body 7 will be hereinafter described. A sleeve 20 integral and coaxial with body 7 extends upward, as shown, and is threaded on the outer periphery thereof on which is retained by mating threads a hemispherical dome 21 having a coaxial circular aperture in the upper end thereof and an internally extending flange 22 forming an inner extending shoulder.

Referring to FIGS. 2, 3, 4, 6, 9 and 1, a gimbal assembly comprises a cylindrical sleeve 23 having a wall of uniform thickness which has pivotally secured therein a body member 24, which is pivoted to opposite sides of the sleeve by left-right pivots 25 journalled therein permitting limited oscillation of the gimbal member 24 about the axis of the pivots 25. A gimbal rocker member 26 is pivotally secured for rotation on fore and aft pivots 27—27 in opposite sides thereof and journalled in member 24 about an axis coplanar and normal to the axis of pivots 25—25. The rocker member 26 has an integral handle extension 28 projecting therefrom.

A bore 29 entering the lower end of member 26 is coaxial with the handle extension 28 and slidably retains a shank 30 of a shoe member 31 having a spherical end surface, retained by a pin 32 laterally through a slot in shank 30 with a compression spring 33 in bore 29 normally urging the shoe member in a downward direction against the upper surface of the diaphragm 15, also shown in FIGS. 6 and 9, the action of which will be hereinafter described.

Referring to FIG. 9, the upward extending sleeve 20 has a bayonet aperture 34 in opposite sides thereof in which bayonet pins 35 are positioned in opposite sides of the sleeve 23 for locking engagement with said bayonet apertures, as illustrated in FIG. 3. Thus it can be seen from FIG. 10 that the entire gimbal assembly can be slidably descended in sleeve 20 with each of the pins 35 in locked engagement in each opposite aperture 34. It is also to be noted that the handle extension 28 may be moved through limited angles in both left and right and fore and aft directions, which will move the shoe member 31 in opposite direction to the movement of the handle extension 28. A stop extension 26s on rocker member 26 will abut member 24 when the former is in the "off" position. The gimbal assembly is secured in the sleeve by bayonet pins 35 which will compress and seal the rim of the diaphragm 15 into groove 14 and the sleeve is secured in this position by a cap 36 having internal threads therein threaded on the sleeve 20 and having a spherical outer surface, as shown in FIGS. 6 and 9.

Referring to FIG. 8, the handle 5 terminates at its lower end in an apron having a concave spherical inner surface with a central bore 37 to receive the end portion of handle extension 28 which is secured by a screw means 38.

Referring to FIG. 6, the cold and hot inlet bores 18 and 19 terminate in shoulders or valve seats 39 and 40 which enter into enlarged inlet bores 41 and 42 in which are secured cold and hot water supply conduits 43 and 44, respectively.

Loosely positioned above the end of each conduit is a sphere 45 to which is centrally secured a stem 46. The spheres 45, when in pressure contact with seats 39 and 40, provide an automatic cut-off for pressurized water in both conduits 43 and 44 when the mechanism above the outlets 18 and 19 is disassembled for inspection or repair. Each sphere is normally held out of sealing contact with its corresponding seat by each stem bearing against the under side of the diaphragm.

In operation and assuming pressurized water is supplied to both the cold and the hot conduits 43 and 44, then the faucet is in its "off" position when the handle 5 is in the position shown in FIG. 2 with the shoe member 31 urged against the upper side of the diaphragm by spring 33 and the lower side of the diaphragm held in sealed position over both inlet bores 18 and 19. When the handle is moved directly rearward then the shoe member 31 will slide rearward over the diaphragm away from its "off" position over bores 18 and 19 and permit the pressure of both the hot and cold water to raise a portion of the diaphragm and permit both the hot and cold water to flow into bore 16 and around the undercut 9 and into passage 12 for flow through the spout 2, as shown by arrow. It is now apparent that the degree of flow from the spout is proportional to the distance the handle is moved rearward.

Figure 7:
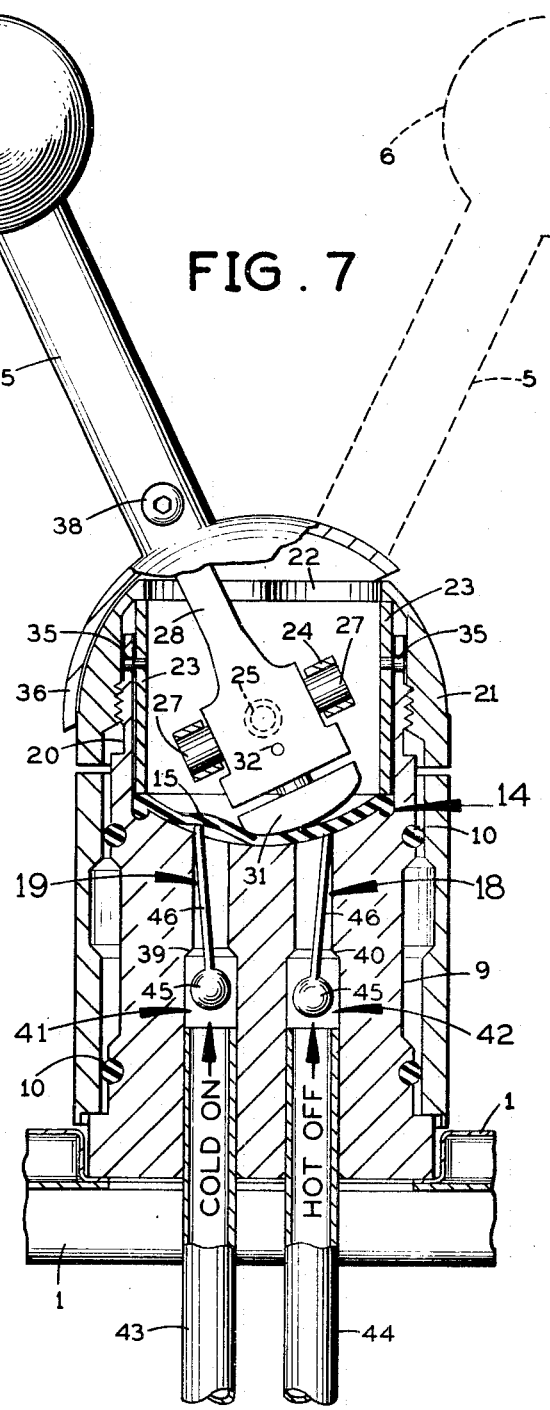
FIG. 7 is the same as FIG. 6 in changed position.

Referring to FIG. 7, when the handle is moved to the left, as shown in full lines, the shoe member 31 will move away from cold water bore 18 only and permit cold water pressure to raise a portion of the diaphragm above the bore 18 and permit the water to flow into outlet bore 16 and around undercut 9 and from spout 2. When the handle is moved in the right hand position, illustrated by dotted lines, the cold water bore 18 will be sealed closed and the hot water bore 19 will raise a portion of the diaphragm to open and release a flow of hot water into bore 16 and then through the spout 2, as above described.

The distance of the movement of the handle from left and right will proportionately correspond to the mixture of hot and cold water delivered from the spout, which volume of flow is proportionately controlled by the distance the handle is moved rearward from its "off" position.

This invention comprehends any constructional modifications which come within the features and functions above described.

Having described our invention, we claim:

1. A single control faucet comprising a fixed cylindrical body member with a coaxial undercut about the perimeter thereof for forming a portion of a peripheral passage,
    a spout member with a channel therethrough having a cylindrical body collar at one end with a bore therethrough journalled for oscillation about said body member with the inlet aperture of said channel opening into a peripheral passage formed by the space between the inner periphery of the collar and the said undercut,
    a central upper end portion of said body member terminating in a concave spherical surface with a circular rim of predetermined width around said surface normal to the axis of said body member,
    a cylindrical threaded sleeve integral and coaxial with said body member extending a predetermined distance upward from the outer edge of said rim surrounding said spherical surface,
    a hot water bore through said body member parallel said axis forming a hot water inlet at the lower end thereof and a hot water outlet port through said spherical surface a predetermined distance from said axis and a cold water bore parallel said axis forming a cold water inlet at the lower end thereof and a cold water outlet port through said spherical surface spaced from said hot water port and a like said predetermined distance from said axis,
    a discharge port in said spherical surface a predetermined distance from both said hot and said cold water port and joining said passage,
    a flexible circular diaphragm with an outer marginal portion thereof positioned on said rim with the lower surface thereof normally in close contact with said spherical surface,
    a cylindrical retaining collar positioned within said threaded sleeve with the lower edge thereof against the upper side of said marginal portion of said diaphragm to retain and seal the latter on said rim,
    an operating lever means pivotally secured in said retaining collar having an upward extending handle adapted to limited angular movement in forward and lateral directions from a central rear "off" position,
    said lever means including a flow control extension depending downward below said retaining collar,
    a flow selecting shoe means slidably retained on the end of said control extension with the lower surface thereof in slidable contact with the upper surface of said diaphragm,
    spring means biased between said control extension and said shoe means to urge the latter against said diaphragm,
    a source of pressurized cold water connected to said cold water bore in said body member,
    a source of pressurized hot water connected to said hot water bore in said body member whereby said shoe means will seal said diaphragm over both said cold and hot water ports when positioned over said ports corresponding to the said "off" position of said operating lever and whereby the selective movement of said lever forward and in a selected lateral position will move said shoe means to a corresponding position from over said ports and permit said hot or cold water or both to selectively raise said diaphragm from said port or ports to deliver a selective flow of said cold or hot water or mixtures thereof into said discharge port and from said faucet.

2. In a single control faucet of the character described a fixed cylindrical body member having a coaxial peripheral undercut about the waist thereof,
    a cylindrical collar member having an outlet spout extending outward from one side thereof with the channel in said spout opening therein,
    said collar member journalled for predetermined oscillation on the outer periphery of said body member and forming a peripheral passage around said body,
    said body member having a concave spherical upper surface of predetermined radius terminating in an outer circular planar rim normal to the axis of said body member,
    said body member having a hot water and a cold water inlet port in said spherical surface in predetermined adjacent relation and distance from said axis,
    a discharge port in said spherical surface joining said passage equi-distant from said hot and said cold port,
    a flexible circular diaphragm means retained on said circular rim with the lower surface thereof normally in contact with said concave surface,
    a source of pressurized hot water and a source of pressurized cold water, a conduit means having one end connected to said source of cold water and the opposite end positioned and sealed in said cold water port in said body member, a second conduit means having one end connected to said source of hot water and the opposite end thereof positioned and sealed in said hot water port in said body member, a gimbal means having an outer cylindrical shell secured in the upper portion of said body member above said diaphragm means with the lower edge of said shell adapted to secure and seal said diaphragm means on said rim, a lever means retained by said gimbal means with the upper portion thereof terminating in an operating handle and the lower portion thereof terminating in a shoe means positioned in slidable contact with the upper side of said diaphragm means, said operating handle and said shoe means adapted for movement in a combination of limited fore and aft and left and right selected positions with predetermined limits, spring means biased between said lever means and said shoe means for urging the latter into predetermined pressure contact with the upper surface of said diaphragm means, said lever means adapted and constructed to be in an "off" position when said shoe means is positioned to hold said diaphragm means in sealed position over each said hot and said cold port and whereby selected aft movement of said shoe means by said handle will permit the said pressurized water from said hot and said cold ports to raise said diaphragm means and permit said selected flow into said outlet port through said passage into and from said spout and the selected left and right movement of said shoe means will permit selected mixtures of said hot and cold water to flow from said spout.

3. The construction recited in claim 2 including a peripheral groove around said body member above and below said undercut, an elastomer ring of uniform cross section in each said groove to seal the clearance between the inner periphery of said collar member and the outer periphery of said body member at the upper and lower ends of said passage.

4. The construction recited in claim 2 including a groove in said rim coaxial with said body member, a circular projection of uniform cross section extending from the underside of said diaphragm means engaged in said groove to seal the margin of said diaphragm on said rim.

5. In a single control faucet of the character described, a body member, said body member having an upper diaphragm retaining surface, a hot water bore through said body member forming a hot water inlet at the lower end thereof and a hot water outlet port in said surface, a cold water bore through said body member forming a cold water inlet at the lower end thereof and a cold water outlet port in said surface in predetermined spaced relation to said hot water port, a discharge outlet passage in said body member terminating at the upper end thereof in a discharge port a predetermined like distance from said hot and cold inlet port, a circular flexible diaphragm normally in contact with said surface and positioned over said inlet and discharge ports, said diaphragm having a marginal edge thereof sealed around the margin of said surface, an operating lever means pivotally secured to said body member above said diaphragm and having an upward extending limited handle adapted to limited angular movement in forward and lateral directions from a central rear "off" position, a shoe means slidably retained on the lower end of said lever means with the lower surface thereof in slidable contact with the upper surface of said diaphragm to normally seal said inlet and discharge ports and to selectively permit the selective opening of said ports when said handle is moved to a selected position from said "off" position, spring means biased between said lever means and said shoe means for urging the latter against the upper surface of said diaphragm, a source of pressurized hot water and a source of pressurized cold water, a conduit means connecting said source of hot water to said hot water bore and the opposite end connected to and extending into said hot water bore a predetermined distance, a second conduit means connecting said source of said cold water to said cold water bore and the opposite end connected to and extending into said cold water bore a predetermined distance whereby the selective movement of said handle from said "off" position will permit the said hot or the said cold water or a mixture thereof to selectively raise said diaphragm from said ports to permit said hot or cold water or mixture thereof to flow into said discharge port.

6. The construction recited in claim 5 including a downward facing valve shoulder in said hot water bore and said cold water bore a predetermined distance from the end of each said conduit therein, valve means loosely positioned in the space between each said shoulder and each corresponding end of said conduit including a stem on each said valve loosely extending upward into each said outlet port and normally bearing against the lower surface of said diaphragm to hold each said valve away from each said corresponding shoulder whereby the disassembly of said diaphragm from said body member will permit said water in each said bore to move each said valve in sealed contact with its corresponding said shoulder for preventing the water from flowing from said outlet ports.

References Cited

UNITED STATES PATENTS

| | | | |
|---|---|---|---|
| 2,497,558 | 2/1950 | Reeves | 137—636.2 |
| 2,837,110 | 6/1958 | Graybill | 137—329.3 X |
| 2,976,887 | 3/1961 | Wilson | 137—625.4 |
| 3,126,914 | 3/1964 | Dombre | 137—625.44 X |
| 3,422,849 | 1/1969 | Manoogian | 137—625.41 |

M. CARY NELSON, Primary Examiner

R. B. ROTHMAN, Assistant Examiner

U.S. Cl. X.R.

137—625.4; 251—176